Figure 5:
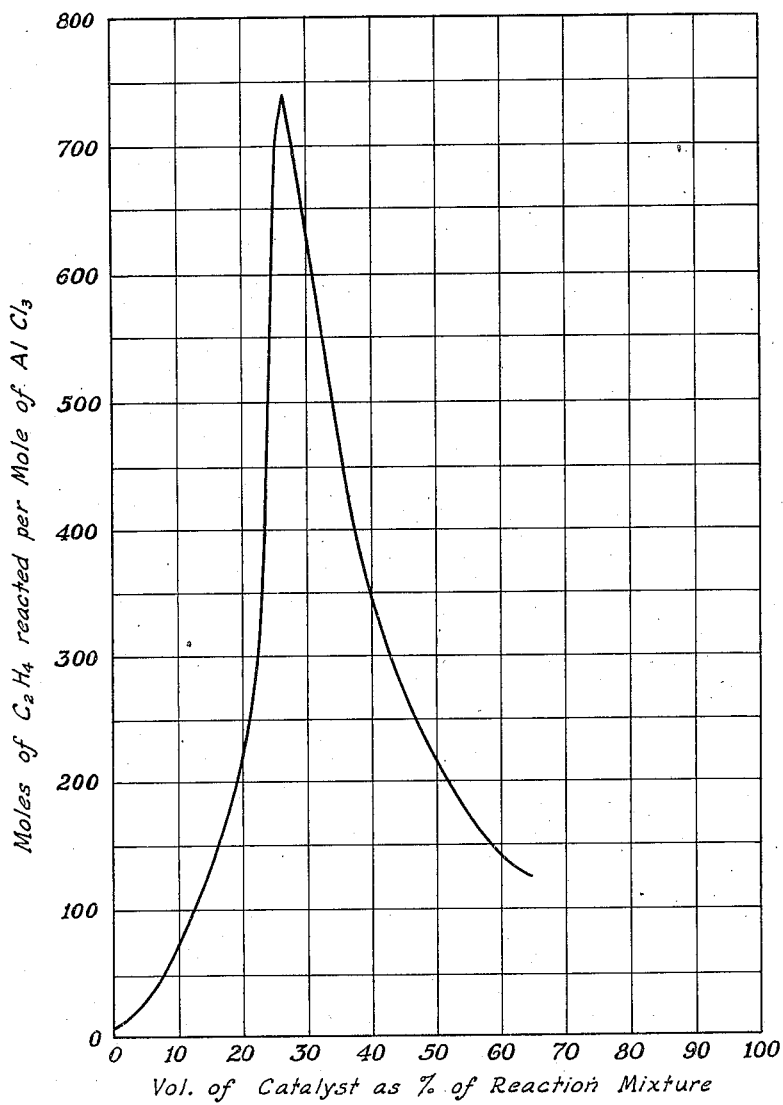

June 22, 1948.  J. L. AMOS ET AL  2,443,758
APPARATUS FOR PRODUCING ALKYLATED
AROMATIC COMPOUNDS
Filed Oct. 7, 1943  2 Sheets-Sheet 1
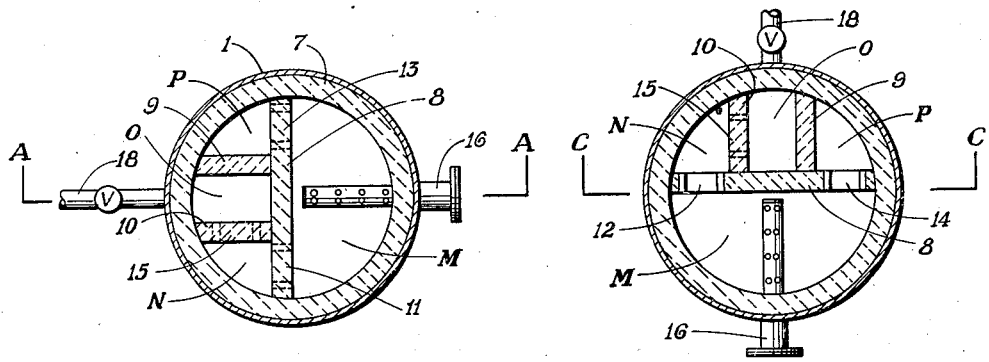
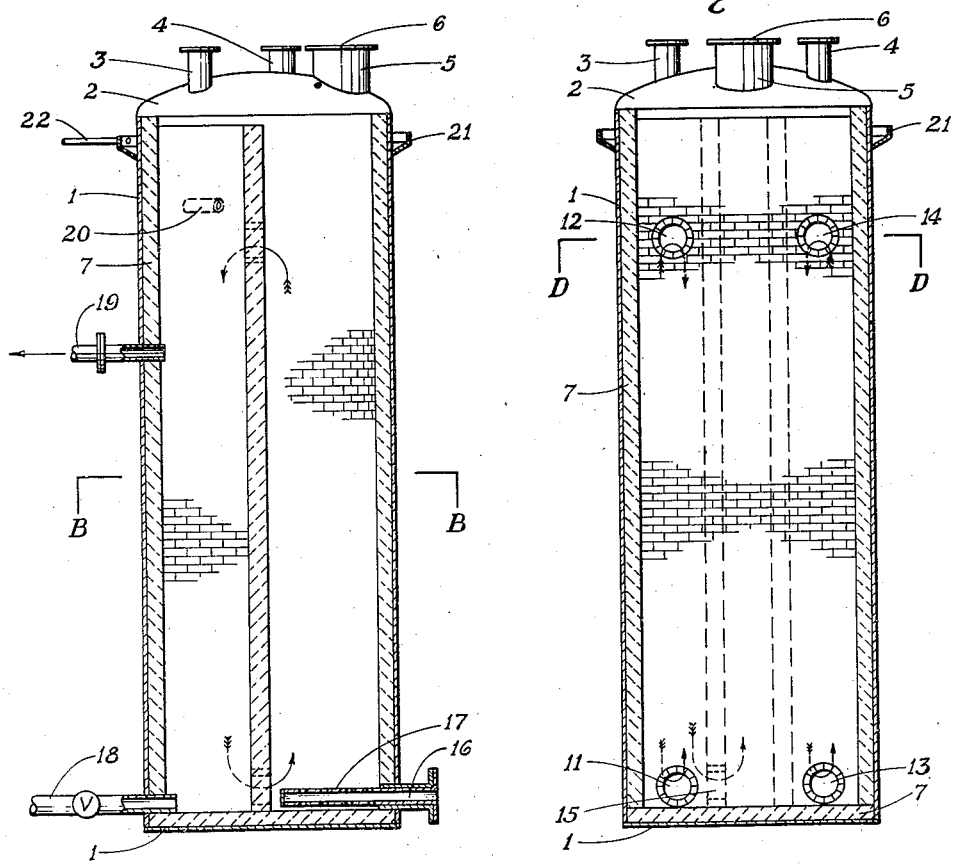
INVENTORS
James L. Amos
Clarence C. Schwegler
BY William Howard Bezenah
Griswold & Burdick
ATTORNEYS Patented June 22, 1948

2,443,758

UNITED STATES PATENT OFFICE 2,443,758

APPARATUS FOR PRODUCING ALKYLATED AROMATIC COMPOUNDS

James L. Amos, Clarence C. Schwegler, and William Howard Bezenah, Midland, Mich., assignors to The Dow Chemical Company, Midland, Mich., a corporation of Delaware Application October 7, 1943, Serial No. 505,260

2 Claims. (Cl. 23—285)

This invention concerns an improved method and apparatus for the production of alkylated aromatic compounds. It particularly concerns the alkylation of aromatic hydrocarbons with olefines.

It is well known that olefines may be reacted with aromatic hydrocarbons or aromatic halohydrocarbons in the presence of Friedel-Crafts catalysts to produce alkylated aromatic compounds. Ethylbenzene, in particular, is manufactured in large quantities by such reaction. The aluminum chloride, usually employed as the catalyst, is expensive and at this time is available in restricted amounts. For purpose of conserving aluminum chloride, it is usual practice to employ it in the minimum proportion which will cause smooth and rapid reaction between the olefine and the aromatic hydrocarbon, e. g. in the manufacture of ethylbenzene from ethylene and benzene, aluminum chloride is usually employed in amount corresponding to between 2 and 4 per cent of the weight of the liquid reactants.

In manufacturing ethylbenzene by the usual method, ethylene is passed into a solution or suspension of aluminum chloride in benzene which preferably contains a small amount of dissolved hydrogen chloride. The aluminum chloride combines with other ingredients of the mixture to form a nearly insoluble complex compound which is dispersed in the reaction mixture and serves as a highly active catalyst for the Friedel-Crafts reaction. After completing the reaction the complex catalyst is permitted to settle as a sludge and is removed from the mixture. In most instances nearly all of the catalyst settles and is separated from the liquor as such sludge, but it sometimes happens that a considerable amount of the catalyst remains dissolved in the liquor. The recovered catalyst may be reused one or more times in the reaction, but its activity decreases during such recycling operations and after a number of cycles it is discarded. After separating the catalyst sludge from a reacted mixture the latter is treated to remove any remaining dissolved catalyst, since the latter, if permitted to remain, causes operating difficulties during recovery of the ethylbenzene from the liquor. The liquor is then fractionally distilled to separate the ethylbenzene product. Usually, a considerable amount of polyethylbenzene compounds are also distilled from the reaction mixture. When ethylbenzene is desired as the reaction product, the polyethylbenzenes may be admixed with benzene and either aluminum chloride or the above-mentioned complex catalyst to effect reaction between the benzene and polyethylbenzenes and form additional ethylbenzene. The catalyst is then removed and the ethylbenzene recovered by distillation.

We have now found, contrary to what was expected, that the amount of olefine which may be reacted with an aromatic compound and the amount of alkylated aromatic product may be produced per pound of aluminum chloride, or other Friedel-Crafts catalyst, may be increased markedly by carrying the alkylation reaction out in continuous manner while maintaining in the reaction zone a large inventory of the complex catalyst instead of, as usual, employing the catalyst in the minimum proportion necessary for smooth and rapid reaction. On a basis of this discovery we have devised a method and apparatus which provide for continuously introducing into a reaction zone the olefine and aromatic reactants and the catalyst required as starting materials in the reaction; for maintaining in the reaction zone a large inventory of catalyst; for continuously circulating the reaction mixture through a plurality of chambers into which the reactor is divided so as to agitate the mixture and provide time for carrying the reaction well toward completion; for accomplishing such agitation and circulation without the aid of a mechanical pump; for causing separation of the complex catalyst from the liquor subsequent to the reaction; for continuously or intermittently withdrawing deactivated catalyst from the reaction zone; and for continuously withdrawing the reaction products from said zone. The invention permits the production of a larger amount of ethylbenzene, or other alkylated aromatic compound, per pound of the catalyst than has heretofore been possible. It also provides a simple and practical method whereby such increased production of an alkylated aromatic compound, per pound of the catalyst, may readily be attained.

Our apparatus for continuously carrying out the alkylation reaction in such manner as to attain these objectives consists essentially of three or more adjacent vertical (or at least inclined) chambers with suitable inlets and outlets to the system and suitable ports, or openings, between the chambers. One such chamber is a reaction chamber within which the reaction takes place to a large extent. Another is a recirculation chamber through which a considerable part of the reaction liquor may circulate from an upper section of the reaction chamber and be returned to a lower section of the latter without leaving the reaction system. A third chamber serves as a settling chamber to permit at least partial settling of the catalyst sludge from the reaction liquor prior to flow of the latter from the reaction system.

Each of the three essential chambers may, and usually does, have functions other than the single function just mentioned. For instance, the reaction chamber is also a circulation chamber and a chamber for permitting mixing of the olefine with the other components of the reaction mixture. The chamber referred to above as a recirculation chamber may also serve as a mixing chamber for the catalyst and the aromatic reactant prior to flow of the latter to the reaction chamber. The alkylation reaction may occur to some extent during flow of the mixture through any, or all, of the chambers.

The three essential chambers co-act to retain an inventory of the complex catalyst in the reaction system, to cause repeated passage of reaction liquor through the complex catalyst layer with thorough mixing with the catalyst before flowing from the reactor, and to permit gradual replenishment of the catalyst and gradual withdrawal of a portion of the catalyst as its activity decreases. The repeated passage of the reaction liquor through the complex catalyst layer is advantageous both in that it furthers the alkylation reaction and that it limits the amount of catalyst which may remain dissolved in the reaction liquor by causing separation of a portion of the dissolved catalyst from the reaction liquor in those instances in which the liquor would otherwise retain in solution an excessively large amount of the catalyst. For instance, we have taken an ethylated benzene reaction liquor which retained in solution 0.7 per cent by weight of aluminum chloride and have agitated it with a portion of the insoluble complex catalyst sludge. After permitting the resultant mixture to settle into layers, it was found that the upper ethylated benzene layer retained only 0.35 per cent of aluminum chloride. The action of the insoluble complex catalyst in limiting the amount of catalyst which may remain dissolved in the reaction liquor reduces the possibility of active catalyst being lost in the reacted liquor which flows from the reaction system.

It will be understood that the reactor may comprise two or more of any of the foregoing essential chambers, i. e. the apparatus may include a total of three or more of the chambers.

In the accompanying drawing, Figs. 1–4 show an alkylator having four vertical chambers. Fig. 5 is a graph showing the effect of changes in the proportion of catalyst maintained in a reaction zone, during the reaction of an olefine with an aromatic compound in continuous manner, on the molecular equivalents of olefine which may satisfactorily be caused to react per mole of the catalyst. In Fig. 5, the proportion of complex catalyst is expressed as per cent of the volume of the reaction mixture in the reactor at any moment. Also, the ratio of the total amount of olefine reacted to the total amount of catalyst used is expressed as molecular equivalents of olefine per mole of $AlCl_3$.

In each of the Figs. 1–4 of the drawing, the apparatus is shown partly in cross-section. Fig. 1 is a side view of the section AA of Fig. 3, and the latter is a top view of the section BB of Fig. 1. Similarly, Fig. 2 is a side view of the section CC of Fig. 4 and the latter is a top view of the section DD of Fig. 2. In the respective Figs. 3 and 4 the reactor is turned by 90° about its vertical axis. Figs. 1 and 2 are corresponding side views partly in cross-section, of the reactor. In all figures of the drawing, similar numbers or letters are used to designate similar parts of the apparatus.

In the drawing, the numeral 1 designates a metal shell for the reactor and the numeral 2 designates a metal top or cap which may be welded or otherwise attached to shell 1 and which is provided with an inlet pipe 3, a vent pipe 4, and a manhole 5 having a detachable cover 6. Shell 1 is lined on the inside with a lining 7 of an acid-resistant material such as acid-resistant ceramic or carbon brickware. Walls 8, 9, and 10, which divide the interior of the reactor into the vertical chambers M, N, O, and P, are constructed of similar acid-resistant material. The wall 8 is provided near the bottom and toward the top with the ports 11 and 12 which connect the chambers M and N and with the ports 13 and 14 which serve as openings between the chambers M and P. Wall 10 is provided near the bottom with a port 15 which connects the chambers N and O. In the drawing arrows are used to indicate the flow of materials through the several chambers and ports just mentioned. The solid part of an arrow indicates flow of material on the viewed side of a wall, and the dotted part of an arrow indicates flow through a concealed part of the reactor.

Toward its lower end, the reactor is provided with an inlet 16 in the form of a porous thimble or sparger which is housed in a perforated metal tube 17 and projects into the chamber M of the reactor. Also, toward the bottom of the reactor is a valved outlet 18 leading from chamber O. Near the midsection of the reactor is an outlet 19 from chamber O. At an upper section of the reactor is an inlet 20 to chamber P. It should be mentioned that the inlet 3 at the top of the reactor also leads to chamber P. If desired, one of the inlets 3 and 20 may be omitted. Near the top and around shell 1 is a ring-shaped trough 21, which is provided with an inlet 22, and serves to spill water over the outer surface of the reactor for purpose of temperature control.

In producing ethylbenzene with the apparatus just described, the complex catalyst comprising aluminum chloride is charged into, or formed within, the reactor in amount such that, when permitted to settle, it has a volume corresponding to from 20 to 50, and preferably from 22 to 40, per cent of the total volume of the charge in the reactor when it is being operated. Usually this volume of the complex catalyst corresponds to between 35 and 90 per cent of the volume of liquor in chamber M of the reactor and is sufficient to fill the chambers M, N, O, and P with the settled complex catalyst to a level corresponding to between 20 and 50 per cent of the height of the outlet 19. If the amount of the complex catalyst maintained in the reactor during operation is decreased below or increased above the proportions just stated, the amount of ethylene which may be reacted, per pound of the catalyst decreases sharply.

Benzene is fed into chamber P through inlet 20 and ethylene is introduced through the inlet 16 at a rate such that at least 60, and preferably 98 per cent or more of the ethylene is reacted. Hydrogen chloride in amount corresponding to from 0.2 to 2 per cent of the volume of the ethylene is preferably introduced together with the latter or with the benzene. Any unreacted ethylene is withdrawn through vent 4. Aluminum chloride, either as such or in the form of the complex catalyst, is introduced through inlet 3, as required in order to cause the reaction to proceed smoothly and rapidly. Usually, from 3 to 6 molecular equivalents of benzene are fed into the reactor per mole of the ethylene, but smaller or much larger proportions of benzene may be used if desired. If a polyethylbenzene, e. g. diethyl- or triethyl-benzene, is desired as a principal product, the molecular ratio of benzene to ethylene may advantageously be reduced.

The ethylene, upon being dispersed, e. g. as small bubbles, in the liquor in chamber M of the reactor, rises while reacting with the liquor and causes an upward flow of the reaction mixture through said chamber. The ethylene is, for the most part, reacted with or dissolved in the liquor during flow through this chamber. The liquor, containing dispersed or dissolved complex catalyst, circulates from chamber M, through the ports 12 and 14, downward through the chambers N and P, and is returned through the ports 11 and 13 to the lower end of chamber M. A portion of the liquor flows from chamber N through port 15 into chamber O and upward within the latter. The liquor flows upward within chamber O at a moderate rate such as to permit at least partial separation by settling of the complex catalyst. The reacted liquor, which retains a small amount of catalyst in dissolved or suspended form, flows from chamber O through outlet 19. As hereinbefore mentioned, fresh catalyst is added continuously or intermittently through inlet 3 as required for continued reaction at a fairly rapid rate and preferably a corresponding amount of used catalyst is withdrawn either through outlet 18 or together with the effluent liquor through outlet 19 so as to maintain a substantially constant inventory of catalyst in the reactor. Usually the catalyst thus withdrawn has lost much of its activity and is not well suited for further use in the reaction.

The alkylation reaction just described is usually carried out at a pressure of from 1 to 2 atmospheres and at temperatures between 70 and 110° C., but it may be carried out at far higher pressures, e. g. at 50 atmospheres or above, and at lower or higher temperatures, e. g. at room temperature or, when operating under pressure, at 120° C. or higher. The reaction is exothermic and for purpose of temperature control the reactor is usually cooled externally during operation. This may be accomplished by feeding water through inlet 22 into trough 21 and causing it to overflow the latter and flow downward over the outer surface of the reactor, or by spraying the reactor with water, etc.

The liquor flowing from the reactor is treated in any of the usual ways, e. g. by settling and/or treatment with water, ammonia, or an alkali, etc., to remove the remaining catalyst and is fractionally distilled to separate unreacted benzene and the ethylbenzene and polyethylbenzene products.

As hereinbefore mentioned, the polyethylbenzenes may be admixed with benzene and a Friedel-Crafts catalyst to effect reaction between the benzene and polyethylbenzenes and form additional ethylbenzene. The spent catalyst from the alkylation reaction often is sufficiently active for use in the reaction between benzene and polyalkylbenzenes, e. g. polyethylbenzenes, to dealkylate the polyalkylbenzenes and form additional monoalkylbenzene. If desired, instead of carrying out the dealkylation reaction separately from the alkylation reaction, the polyalkylbenzenes may be returned to the alkylation reaction where they serve to suppress the further formation of the polyalkylbenzene products. For instance, in the manufacture of ethylbenzene, as just described, the polyethylbenzenes may be recycled to the alkylation reaction to suppress the further formation of polyethylbenzenes and to thereby direct the reaction toward the formation of monoethylbenzene in increased amount.

The foregoing method and apparatus may be modified without departing from the invention. For instance in the apparatus shown by Figs. 1-4 of the drawing, either of the inlets 3 and 20 may be eliminated and the remaining of these inlets be used for introducing both the benzene and the catalyst when carrying out the alkylation reaction. Also, the port 11 may, if desired, be eliminated and the reaction mixture be caused to flow successively through the chambers P, M, N, and O while continuously recirculating portions of the liquor through chambers P and M. Furthermore, instead of having four interconnected vertical chambers, the reactor may readily be designed and constructed so as to have only three, or to have more than four, of such chambers. Other ways in which the shape or design of the apparatus may be modified will be apparent to those skilled in the art.

The method and apparatus are not restricted to the manufacture of ethylbenzene, but may be applied in producing other alkylated aromatic compounds. For instance, it may be used in producing isopropylbenzene or a polyisopropylbenzene by the reaction of propylene with benzene; in producing ethyl-chlorobenzene by the reaction of ethylene with chlorobenzene; in producing a butylbenzene from butylene and benzene; or in producing ethyl-isopropylbenzene by the reaction of propylene with ethylbenzene, etc. Although aluminum chloride is preferably employed as, or in, the catalyst, other Friedel-Crafts catalysts such as aluminum bromide, ferric chloride, or a mixture of aluminum chloride and ferric chloride, etc., may in some instances be used. The gaseous olefine employed as a reactant in the process need not be pure. Instead, mixtures of olefines with one another or with non-reactive gases, e. g. methane, ethane, propane, or butane, etc., may be used. Unreacted gases are vented from the reactor through outlet 4.

The following example describes a series of experiments showing ways in which the invention has been practiced and illustrating certain of its advantages. The example is not to be construed as limiting the invention.

*Example*

In each of a series of experiments a reactor was charged with a freshly formed complex catalyst in amount such as to occupy, when permitted to settle, the per cent of the liquid capacity of the reactor stated in the following table. The complex catalyst was, at the time when collection of the data in the table was started, one which had been freshly formed by the mixing together aluminum chloride, benzene, ethylene, and hydrogen chloride. During a run, benzene and ethylene (containing a small amount of hydrogen chloride) were continuously fed into the reactor in the relative proportions of approximately 4 molecular equivalents of benzene per mole of ethylene. Reaction liquor was continuously circulated from the top and into the bottom of the reaction chamber while at the same time causing a portion of the liquor to flow from the reactor at a rate corresponding to the total rate of feed to the reactor. The reactor was maintained full of the reaction mixture at all times. During each run a small proportion, i. e. far less than 1 per cent by weight, of catalyst remained dissolved in the reaction liquor which flowed from the reactor and in all runs, except run 1 of the table, this was the only way in which catalyst was removed from the reaction zone during the reaction. In all runs, fresh aluminum chloride was periodically added as necessary in order to maintain a substantially constant inventory of the complex catalyst in the reactor. Run 1 differed from the other runs in that the reaction liquor, in recirculating from the top to the bottom of reaction chamber, was passed through a bed of granular aluminum chloride and the aluminum chloride complex catalyst thus formed was continuously drained from the bottom of the reactor as it separated from the reaction liquor, i. e., in this run the inventory of settled complex catalyst in the reactor was very small and is in the table indicated as being "practically nil." Each run was carried out at approximately atmospheric pressure and at a temperature of about 85° C. In each experiment, the total quantities of aluminum chloride employed and of ethylene reacted were determined. The period of continuous operation, as just described, varied in the different experiments from 1.6 to 8 days, i. e., each experiment was of sufficient duration to permit the obtainance of reliable operating data. The following table states the proportion of complex catalyst present in each reaction mixture as per cent of the total volume of the mixture present at any instant in the reactor. It also gives the per cent of the ethylene feed which was consumed in each reaction and the molecular equivalents of ethylene reacted per mole of aluminum chloride (AlCl₃) employed in the catalyst. In each experiment, monoethylbenzene was obtained as the principal product and polyethylbenzenes as by-products.

*Table*

| Run No. | Undissolved Complex Catalyst as Per Cent of Vol. of Mixture in Reactor | Per Cent of C₂H₄ Consumed | Moles of C₂H₄ Reacted Per Mole of AlCl₃ |
|---|---|---|---|
| 1 | (¹) | 67 | 8 |
| 2 | 7.15 | 95 | 81 |
| 3 | 14.3 | 96 | 130 |
| 4 | 19.1 | 92 | 205 |
| 5 | 20.2 | 96 | 241 |
| 6 | 26.0 | 96 | 740 |
| 7 | 27.4 | 97 | 542 |
| 8 | 58 | 96 | 157 |

¹ Practically nil.

As hereinbefore mentioned, the curve shown as Fig. 5 of the drawing is based on the data in the above table.

Other modes of applying the principle of the invention may be employed instead of those explained, change being made in the method or apparatus herein disclosed, provided the step or steps stated by any of the following claims or the equivalent of such stated step or steps be employed.

We therefore particularly point out and distinctly claim as our invention:

1. An apparatus comprising the following adjacent vertical chambers: a chamber A, at least one chamber B, and a chamber C; which chambers are connected by ports in walls of the same as follows: chamber A is connected by a port in a lower section of the same and by another port in an upper section of the same with at least one chamber B and one of the chambers A and B is connected by a port in a lower section thereof with chamber C; the chamber A being provided with an inlet to a lower section thereof and a vent from an upper section of the same; one of the chambers A and B being provided with another inlet; and the chamber C being provided with an outlet from an upper section of the same.

2. An apparatus comprising the following adjacent vertical chambers: a chamber A, at least one chamber B, and a chamber C; which chambers are connected by ports in the walls of the same as follows: chamber A is connected by a port in a lower section of the same and by another port in an upper section of the same with each chamber B and one of the chambers A and B is connected by a port in a lower section thereof with chamber C; the apparatus being further provided with inlets and outlets as follows: an inlet for gas to a lower section of chamber A and an outlet for venting gas from an upper section of chamber A, an inlet for liquid to one of the chambers A and B other than that connected directly by a port with the chamber C, an outlet for liquid from a lower section of chamber C and another outlet for liquid from chamber C at a point above the outlet just mentioned and also above the port connecting one of the chambers A and B with chamber C.

JAMES L. AMOS.
CLARENCE C. SCHWEGLER.
WILLIAM HOWARD BEZENAH.

REFERENCES CITED

The following references are of record in the file of this patent:

UNITED STATES PATENTS

| Number | Name | Date |
|---|---|---|
| 1,953,702 | Davidson | Apr. 3, 1934 |
| 2,238,802 | Altshuler et al. | Apr. 15, 1941 |
| 2,305,026 | Munday | Dec. 15, 1942 |
| 2,306,261 | Crawford et al. | Dec. 22, 1942 |
| 2,308,736 | Smith | Jan. 19, 1943 |
| 2,334,553 | Harding | Nov. 16, 1943 |
| 2,334,955 | Putney | Nov. 23, 1943 |
| 2,338,711 | d'Ouville et al. | Jan. 11, 1944 |
| 2,364,203 | Francis | Dec. 5, 1944 |